(12) United States Patent
Bryant et al.

(10) Patent No.: US 9,806,426 B2
(45) Date of Patent: Oct. 31, 2017

(54) ELECTROMAGNETIC FIELD ABSORBING COMPOSITION

(75) Inventors: Richard Bryant, Fleet (GB); Greg PW Fixter, Hook (GB); Shahid Hussain, Reading (GB); Adrian ST Vaughan, Weybridge (GB)

(73) Assignee: QINETIQ LIMITED, Hampshire (GB)

(*) Notice: Subject to any disclaimer, the term of this patent is extended or adjusted under 35 U.S.C. 154(b) by 0 days.

(21) Appl. No.: 13/260,612

(22) PCT Filed: Mar. 24, 2010

(86) PCT No.: PCT/GB2010/000532
§ 371 (c)(1),
(2), (4) Date: Sep. 27, 2011

(87) PCT Pub. No.: WO2010/109174
PCT Pub. Date: Sep. 30, 2010

(65) Prior Publication Data
US 2012/0025111 A1     Feb. 2, 2012

(30) Foreign Application Priority Data
Mar. 27, 2009  (EP) .................................... 0905312

(51) Int. Cl.
*H01Q 17/00* (2006.01)
*C08K 7/06* (2006.01)
(Continued)

(52) U.S. Cl.
CPC ............. *H01Q 17/002* (2013.01); *C08K 7/06* (2013.01); *C09D 5/32* (2013.01); *C09D 7/1216* (2013.01);
(Continued)

(58) Field of Classification Search
CPC ... B82Y 30/00; C01B 31/0206; C01B 31/022; H01Q 17/002; F05B 2260/99;
(Continued)

(56) References Cited

U.S. PATENT DOCUMENTS 2,599,994 A * 6/1952 Salisbury ...................... 403/292
4,569,786 A   2/1986 Deguchi
(Continued)

FOREIGN PATENT DOCUMENTS

CN   1470581    1/2004
CN   101255292  9/2008
(Continued)

OTHER PUBLICATIONS

Hara Hiroshi, Hirata Masumi, Sano Hiroki, Takagi Shoichi; WO2007126133 (A1) Composite Carbon Fiber Sheet; Espacenet description.*

(Continued)

*Primary Examiner* — Michael Maskell
(74) *Attorney, Agent, or Firm* — Nixon & Vanderhye P.C.

(57) ABSTRACT

This invention relates to the field of an electromagnetic (EM) field absorbing composition, in particular, those capable of providing absorbance in the frequency of commercial radar. The composition finds particular use as a radar absorbing coating for wind turbines, in particular for use in onshore and offshore environments. There are further provided coated surfaces comprising the composition, methods of absorbing EM radiation, and methods of use of such a composition, such that a surface coated in the composition is capable of absorbing EM radiation. There is provided an electromagnetic radiation absorbing composition comprising elongate carbon elements with an average longest dimension in the range of 50 to 1 000 microns, with a thickness in the range of 1 to 15 microns and present in the (Continued)

range of from 0.5 to 20 volume % dried, in a non conductive binder.

10 Claims, 5 Drawing Sheets

(51) Int. Cl.
 *C09D 5/32* (2006.01)
 *C09D 7/12* (2006.01)
 *C08K 3/04* (2006.01)

(52) U.S. Cl.
 CPC .............. *C09D 7/1291* (2013.01); *C08K 3/04* (2013.01); *F05B 2260/99* (2013.01); *Y10T 156/10* (2015.01)

(58) Field of Classification Search
 CPC ... C08K 7/06; C08K 3/04; C09D 5/32; C09D 7/1291; C09D 7/1216; Y10T 156/10
 USPC .......... 250/515.1; 428/293.1, 299.1; 342/1–5; 523/137; 156/89.26
 See application file for complete search history.

(56) References Cited

U.S. PATENT DOCUMENTS

| | | | |
|---|---|---|---|
| 4,606,848 A | 8/1986 | Bond | |
| 5,394,149 A | 2/1995 | Fujita et al. | |
| 6,399,228 B1* | 6/2002 | Simpson | 428/699 |
| 6,399,737 B1* | 6/2002 | Elkovitch | C08K 9/02 428/411.1 |
| 6,734,262 B2* | 5/2004 | Patel | C08L 79/08 106/472 |
| 2001/0016254 A1* | 8/2001 | Mizuguchi | B29C 70/025 428/292.1 |
| 2002/0171578 A1* | 11/2002 | Strait | H01Q 17/00 342/1 |
| 2005/0127329 A1* | 6/2005 | Wang et al. | 252/500 |
| 2005/0272856 A1* | 12/2005 | Cooper | B82Y 30/00 524/496 |
| 2007/0051928 A1 | 3/2007 | Horton | |
| 2008/0113091 A1* | 5/2008 | Tang | B05C 17/00553 427/140 |
| 2008/0311373 A1 | 12/2008 | Hsu et al. | |
| 2009/0121491 A1* | 5/2009 | Mikkelsen | 290/55 |
| 2009/0135042 A1* | 5/2009 | Umishita | B82Y 30/00 342/1 |
| 2009/0233092 A1* | 9/2009 | Hara et al. | 428/339 |

FOREIGN PATENT DOCUMENTS

| | | | |
|---|---|---|---|
| EP | 0742095 | 11/1996 | |
| EP | 1947923 | 7/2008 | |
| JP | 60-260651 | 12/1985 | |
| JP | 2009-57407 | 3/2009 | |
| WO | WO 2007126133 A1 * | 11/2007 | .............. C08J 5/042 |
| WO | WO 2009/095654 | 8/2009 | |

OTHER PUBLICATIONS

International Search Report for PCT/GB2010/000532 dated Jun. 16, 2010.
Written Opinion of the International Searching Authority.
GB Search Report for 0905312.5 dated Jul. 23, 2009.

* cited by examiner

ELECTROMAGNETIC FIELD ABSORBING COMPOSITION

This application is the U.S. national phase of International Application No. PCT/GB2010/000532 filed 24 Mar. 2010 which designated the U.S. and claims priority to GB 0905312.5 filed 27 Mar. 2009, the entire contents of each of which are hereby incorporated by reference.

This invention relates to the field of an electromagnetic (EM) field absorbing composition, in particular, those capable of providing absorbance in the frequency of commercial radar. The composition finds particular use as a radar absorbing coating for wind turbines, in particular for use in onshore and offshore environments. There are further provided coated surfaces comprising the composition, methods of absorbing EM radiation, and methods of use of such a composition, such that a surface coated in the composition is capable of absorbing EM radiation.

Wind turbines interfere with radar systems leading to errors in detection of other objects. Radar systems work by sending out pulses of electromagnetic energy, which are reflected back from the objects that controllers wish to detect, such as the location of an aircraft. The controller must distinguish the objects from the clutter i.e. unwanted returns, such as reflections from wind turbines and buildings, as well as other background noise. Therefore, reducing the reflected energy from wind turbine towers may reduce their adverse impact on radar systems and lead to an increase in their use.

According to a first aspect of the invention there is provided an electromagnetic radiation absorbing composition comprising a carbon filler comprising elongate carbon elements with an average longest dimension in the range of 20 to 1000 microns, with a thickness in the range of 1 to 15 microns, characterised wherein the total carbon filler content is present in the range of from 1 to 20 volume % dried, in a non conductive binder.

The absorbers of the invention are narrowband absorbers, typically less than 1 GHz in bandwidth, and so are particularly unsuitable for use in military applications, which require broadband radar absorption. Thus dielectric fillers, such as elongate carbon elements when provided in a composition according to the invention are not suited to broadband radar absorption applications.

The volume percentages hereinbefore and hereinafter are defined as a volume percentage of the final dried composition (i.e. without solvent). However, in order to facilitate the composition being deposited or applied in the form of a coating i.e. one or more layers, a solvent may be present. It may be desirable to add sufficient solvent such that the composition may be applied to achieve the required final dried coating thickness in order to absorb at the frequency of the incident radiation. The composition may comprise a liquid formulation prior to application, and will preferably be in the form of a dried coating after its application.

Preferably the elongate carbon elements are present in the range of from 1 to 15 volume % dried, more preferably of from 2 to 10 volume % dried. By total carbon filler content is meant the total volume % of carbon filler in the composition The addition of carbon fillers outside of the claimed range may lead to overlapping particulates and reflection rather than absorption.

The elongate carbon elements have an average longest dimension in the range of from 50 to 750 microns, preferably in the range of from 50 to 500 microns, more preferably in the range of from 100 to 300 microns, yet more preferably in the range of from 100 to 150 microns (assuming a normal distribution). Where processing methods give rise to other element size distributions, not more than 25% by weight of the elongate carbon elements should exceed 500 microns. It has been successfully shown that elongate carbon elements which are in the range of 50 to 300 microns and present in the range of 0.5 to 20% will absorb radiation rather than reflect incoming radiation.

The elongated carbon elements preferably have an average thickness in the range of 1 to 15 microns; more preferably the average thickness is in the range of from 1 to 10 microns, or even 5 to 10 microns. In a preferred arrangement the elongate carbon elements have an average thickness to average longest dimension ratio of 1:10 to 1:25. Spherical particles and chopped carbon fibres, such as those prepared by chopping continuous fibres, which typically produce fibres in the region of 4 mm to 6 mm (4000 to 6000 microns), typically provide reflective compositions and so both spherical and chopped carbon types are undesirable, as outlined in more detail, below.

The elongate carbon elements may be of any cross section shape, preferably the elongate carbon elements are carbon fibres. Carbon fibres are typically prepared from continuous substantially cylindrical fibres that are machined to the desired length. Preferably the elongate carbon elements are carbon fibres that have been machined to the desired length. The machining method that is typically used to produce elongate carbon elements in the desired range according to the invention is milling.

A coating of dried composition according to the invention is particularly suitable for providing a narrowband radar absorbing coating for wind turbines, especially wind turbines that are located in marine environments. The composition when applied to a surface, such as, for example a wind turbine, at a selected thickness may reduce radar reflections. The reduction of these reflections reduces the structure's impact on the operation of nearby air traffic control (ATC), air defense (ADR), meteorological (MR) and Marine navigational radars (MNR). The composition according to the invention finds particular use for absorbing known radar frequencies from known local sources, such that renewable energies systems, such as wind farms, may be more readily located near existing radar installations.

Conventional radar absorbing materials comprise formulations containing ferromagnetic materials, and so are very susceptible to rusting during their lifetime. Therefore an advantage of the current invention is that the absorbing composition will not rust, as the elongate carbon elements are not be capable of reacting with air and moisture. It is well known that the formation of rust is accelerated in the presence of salt water; hence the composition according to the invention is particularly useful in coastal environments.

Electromagnetic absorbing compositions rely on electromagnetically active materials within a composition to interact with the impinging electromagnetic field. The processing of electromagnetically active materials is complex and requires control over the electric and magnetic components within said materials, such that they can then interact with the time varying electric and magnetic field components associated with the incoming electromagnetic fields. The composition according to the invention does not require any control of the magnetic component in the material.

The electromagnetic requirements of Radar Absorbing Materials (RAM) are well-established. The first requirement is to maximise the electromagnetic radiation entering the structure, by minimising front face reflection. This is achieved if the real and imaginary components of the complex permittivity, $\epsilon$, and permeability, $\mu$, are separately equal, as derived from the perfect impedance match condition. The second requirement is that the signal is sufficiently attenuated once the radiation has entered the material. This condition is met for high values of imaginary permittivity and permeability, which by definition provide the contribution to dielectric and magnetic loss respectively. This invention relates to the use and control of dielectric losses by the narrow selection of the average longest dimension (i.e. the length) of the elongate carbon element and its percentage inclusion within said composition.

The thickness of a coating of dried composition may preferably be selected in the range of from $\lambda/3$ to $\lambda/5$ of the wavelength of the resonant frequency of the incident radiation, more preferably in the region of one quarter of the wavelength ($\lambda/4$) of the resonant frequency of the incident radiation.

Accordingly there is provided a radar frequency absorbing surface, structure or body or portions thereof comprising at least one dried coating according to the invention. In a preferred arrangement the thickness said coating is one quarter of the wavelength ($\lambda/4$) of the resonant frequency of the incident radiation to be absorbed.

More precisely the below relationship is observed in Formula (I):

$$\lambda = \frac{\lambda_0}{\sqrt{\varepsilon\mu}} \quad \text{Formula I}$$

wherein $\lambda$ corresponds to the wavelength in the coating of dried composition, where $\lambda_0$ is the free space wavelength and $\in$ and $\mu$ are the permittivity and permeability of the coating of dried composition according to the invention. Nominally the permeability is approximately 1 (free space) for the carbon fibres as the fibres do not possess any magnetic properties.

The intrinsic dielectric properties of the coating of dried composition according to the invention may be described by the complex dielectric constant or effective permittivity:

$$\in(\omega) = \in'(\omega) - i \cdot \in''(\omega)$$

where $\in'$ and $\in''$ are the real and imaginary components of permittivity, $\in$, respectively and $i = \sqrt{-1}$. The term $\in'$ is associated with energy storage and $\in''$ is associated with loss or energy dissipation within a material. The ability to absorb EM radio or microwave radiation is dictated by the optimum real and imaginary components of permittivity being obtained.

The dielectric properties of the coating of dried composition according to the invention are dependent upon the microstructure formed within said coating. Spherical carbon particles tend to form isolated clusters within a composite structure, which leads to relatively low conductivity and dielectric loss ($\in''$), which is insufficient for absorption of electromagnetic waves. The use of chopped carbon fibres, whose average length is in excess of 4 mm, requires relatively low loadings (<1 vol %) in order to lead to electrically connected networks and concomitant reflection rather than absorbance. Therefore both spherical particles and carbon fibres whose average length is in excess of 4 mm, are unsuitable for providing effective absorbing compositions.

The required thickness of the dried coating of composition according to the invention is selected depending on the frequency/wavelength of the incident radiation, as mentioned above. In order to carefully control the thickness the coating of composition may be cast in the form of an appliqué film which has been prepared under controlled conditions to the selected thickness. Alternatively, the composition may be applied directly to an existing structure, such as, for example, a wind turbine by known methods such as, for example spraying, rollering or brushing. In a preferred arrangement the application is performed such that each successive layer is applied substantially orthogonally to the preceding layer. This provides an advantage that if during the manufacture or mixing of the formulation the elongate carbon elements undergo any degree of alignment, then subsequent applications applied at orthogonal orientations will maximise absorbance in all polarisation orientations of incoming radiation.

In a further arrangement the total carbon filler content volume % may be different in each successive application layer, and may also be applied in an orthogonal orientation as hereinbefore defined.

Many structures and especially wind turbine towers either contain large amounts of metal or are constructed almost entirely out of metal, which leads to their interference with radar. Where the surface of said structure is metal the composition according to the invention may be applied directly to the metal surface, as the metal structure serves to provide a reflective backplane.

Where the surface, structure or body is not substantially constructed from metal, preferably there is provided an electromagnetic reflective backplane between the surface, structure or body and the at least one dried coating according to the invention. Therefore, where the outer surface of a structure, such as, for example a wind turbine tower is not substantially prepared from a metal and there is interference with nearby radar, it may be desirable to provide an EM reflective backplane, such as, for example, an EM reflective coating, a metal foil or electromagnetic (EM) shielding paint, directly on the surface of said tower, i.e. between the surface of the structure and the composition according to the invention, to provide. One such example of an EM shielding paint is Applicant's PCT application GB2009/000226.

The non conductive binder may be selected from any commercially available binder; preferably it may be selected from an acrylate binder (such as, for example, methyl methacrylate MMA), an acrylic binder, an epoxy binder, a urethane & epoxy-modified acrylic binder, a polyurethane binder, an alkyd based binder, which may be a modified alkyd, or from fluoropolymer based binders, preferably a two part polyurethane binder. Clearly the binders, thickeners and dispersion agents as routinely used in typical paint formulations are not volatile and so will typically not be lost during the curing i.e. drying process. In contrast to the binders, the solvent that is added to aid deposition or application may evaporate during the drying process.

A number of thickeners and solvents, such as, for example, those routinely used in paint formulations, may be added to the composition in order to improve the flow during application and improve its adherence to different surfaces.

Many structures are painted to provide a pleasant visual appearance. The composition according to the invention may be over painted with a suitable decorative paint. Particular advantage is found when the uppermost layer of composition has a lower vol % of carbon than the preceding layer, preferably the uppermost layer has substantially no carbon, such as, for example, a commercial non EM absorbing paint. The non EM paint will have a lower permittivity and therefore provides a better impedance match to free space. This reduces the reflection of the radiation at the front face, allowing more to penetrate into the absorbing layer and to be absorbed.

In an alternative arrangement the composition according to the invention may further comprise a paint pigment that is present in the range of from 2 to 20 volume % of dried volume, preferably present in the range of from 5 to 10 volume % of dried volume. The pigment will be present in sufficient amount to provide colour to the composition without reducing the absorption properties of said composition.

The paint pigment preferably has an average particle size diameter in the range of 150 to 500 nm, more preferably an average particle size diameter in the range of 200-250 nm. The paint pigment will preferably have a tint reducing power higher than 1700, preferably a tint reducing power higher than 1900. The paint pigment may be any opaque paint pigment, more preferably the paint pigment is $TiO_2$. The paint pigment provides a brightening effect and helps to reduce the need for painting over the composition according to the invention with a decorative colour paint. It is desirable to use $TiO_2$ grades that have a tint reducing power of at least 1700, with a surface treatment <18%, and a crystal size 230 nm, preferably high opacity $TiO_2$ pigments, which possess alumina-zirconia surface treatment (<7%), and possess a relative tint reducing power of 1900, refractive index of 2.7 and a mean crystal size of 220 nm are used. These high opacity grades of $TiO_2$ exhibit improved dispersion characteristics.

It may be desirable to add further pigments and/or dyes to the composition, such as to provide different coloured paints. There may be one or more non-white or coloured further pigments added to the composition, such further pigments may include, for example, inorganic or organic pigments such as metal oxides, phthalocyanines, or azo pigments etc.

The extent of the coverage of the dried composition on a surface, body or structure will depend on the extent of the reflective nature of the surface, body or structure. It will be clear to the skilled man that greater absorption will be achieved if the entire surface, body or structure is coated with the composition.

Accordingly there is further provided a method of providing absorption of electromagnetic radiation at a selected frequency on a surface structure or body or portions thereof, comprising the step of determining the selected frequency, applying at least one coat of said composition at a thickness which selectively absorbs at said frequency or an appliqué film with a thickness which selectively absorbs at said frequency, to a first side of said surface structure or body or portions thereof, and optionally to a second side.

The absorbance will only need to occur at the selected frequency of the nearby radar source. Typical radar systems operate at very precise frequencies, rather than a broad band. The frequencies typically lie within the range of from 0.1 to 20 GHz.

Accordingly there is provided the use of a composition according to the invention, wherein the composition is applied to a surface, structure or body or portions thereof at a selected thickness so as to provide a coating capable of absorbing electromagnetic radiation at a selected frequency.

Embodiments of the invention are described below by way of example only and with reference to the accompanying drawings in which.

Figure 1A:
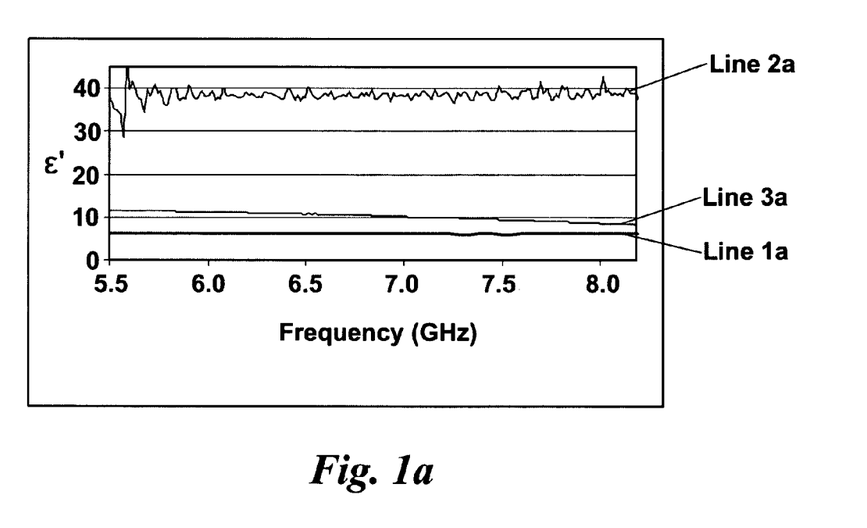
FIG. 1a and FIG. 1b show graphs of the real component of permittivity and the imaginary component of permittivity (dielectric loss), respectively for three different aspect ratio carbon elements.
Figure 1B:
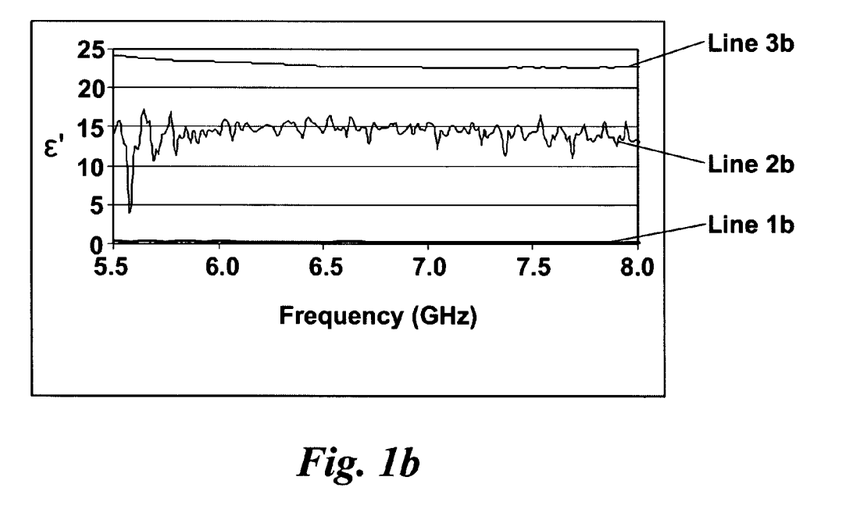

Turning to FIGS. 1a and 1b, FIG. 1a shows a graph of the real component of permittivity for (i) spherical particles 20 vol % in wax, line 1a, (ii) carbon fibres according to the invention, 6 vol % in PU, line 2a and (iii) chopped fibres 1 vol % in PU, line 3a. The use of wax, rather than PU, as the inert binder for the spherical particles does not alter the permeability/permittivity, and so does not change the formulations effectiveness as an absorber.

FIG. 1b shows a graph of the imaginary component of permittivity (dielectric loss) for (i) spherical particles 20 vol % in wax, line 1b, (ii) carbon fibres according to the invention, 6 vol % in PU, line 2b and (iii) chopped fibres 1 vol % in PU, line 3b. The results are discussed in Experiment 1, below.

FIGS. 2a to 2e show graphs of the permittivity of milled carbon fibres dispersed in PU over a range of frequencies, with different rates of inclusion at 0.5 vol %, 2 vol %, 3 vol %, 5 vol % and 6 vol %, respectively. The graphs 2a to 2e show that as the vol % of carbon fibre increases, both the real ∈' (upper lines) and imaginary ∈E" (lower lines) components of permittivity increase.

Figure 2A:
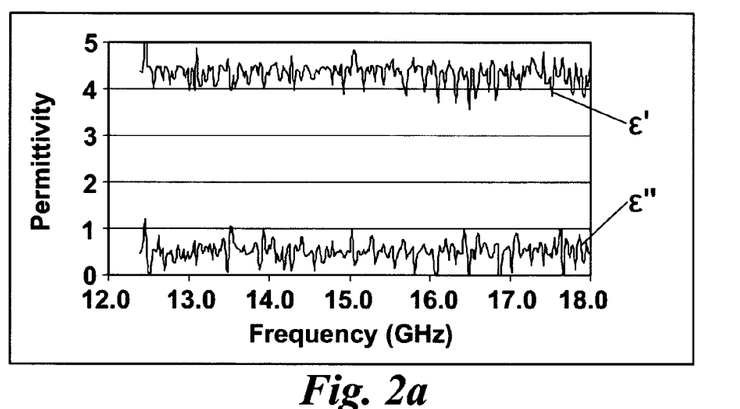
FIGS. 2a to 2e show graphs of the permittivity of milled carbon fibres dispersed in polyurethane (PU) at various percentage fills by volume.
Figure 2B:
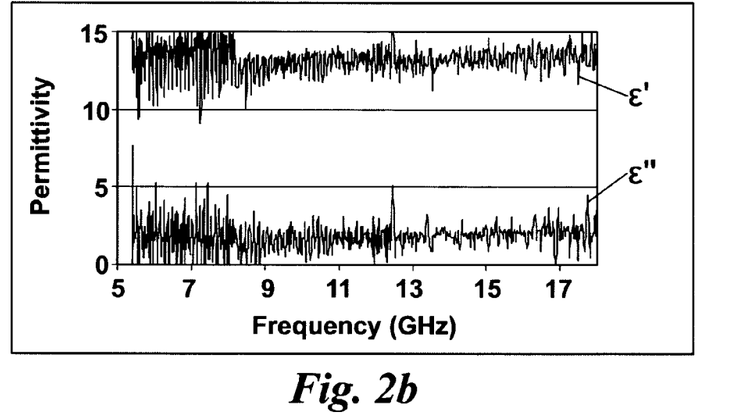
Figure 2C:
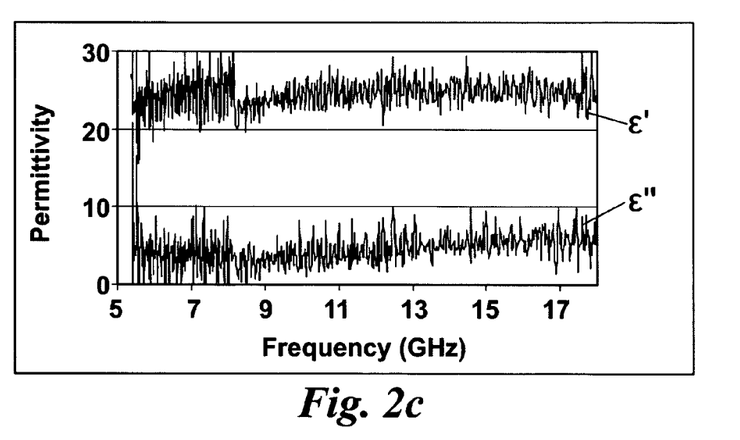
Figure 2D:
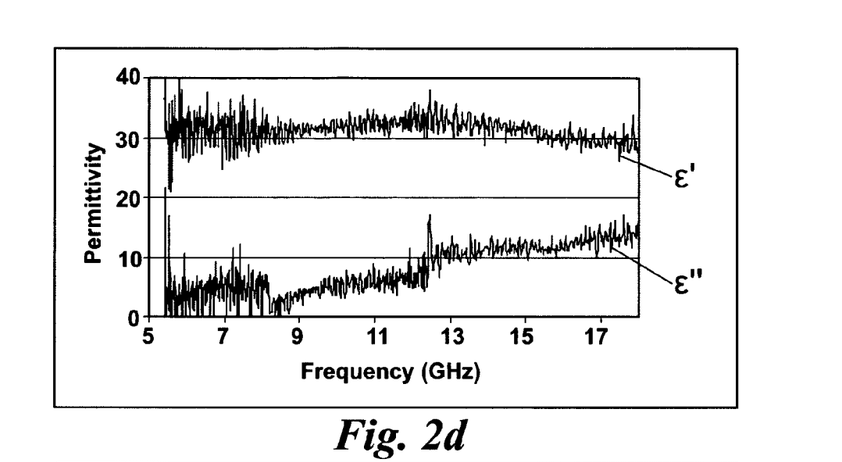
Figure 2E:
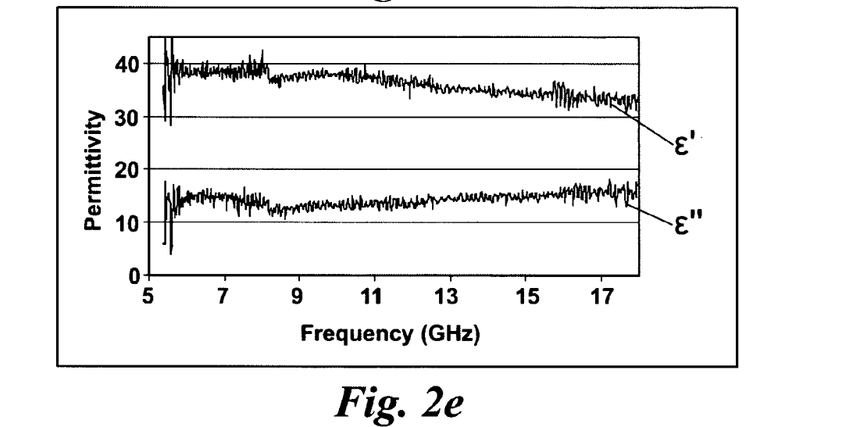

However, at lower levels of inclusion, such as FIG. 2a, shows that when the loading is reduced to 0.5 vol %, poor levels of loss (imaginary permittivity) are exhibited. This means there is no effective mechanism for energy dissipation within the layer and therefore low vol % may be considered to be ineffective for the production of radar absorbing materials.

Figure 3:
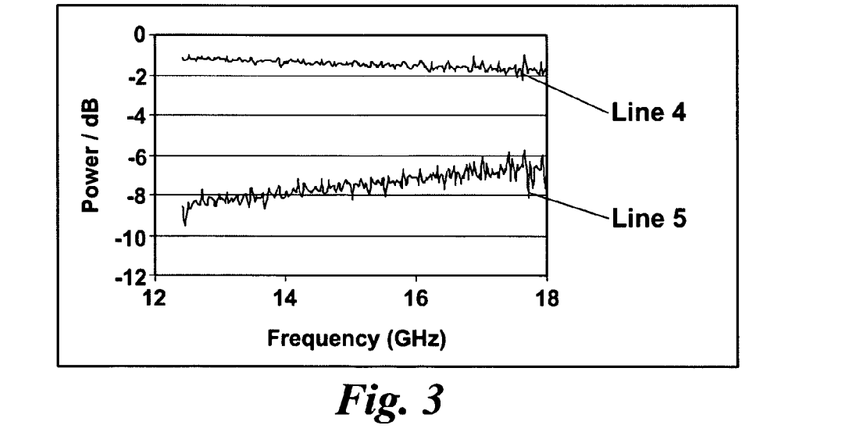
FIG. 3 shows a graph of reflection and transmission through a sample composed of milled carbon fibres dispersed in PU at 0.5% by volume.

FIG. 3 shows a graph of reflection, line 5, and transmission, line 4, through a sample composed of milled carbon fibres dispersed in PU at 0.5% by volume (sample XC4343), FIG. 3, shows that when the sample is loaded with very low levels of carbon fibre (even in the highly preferred length range) the composition possess low reflectance, line 5, and is highly transparent to the incident radiation, i.e. due to the lack of absorption.

Figure 4:
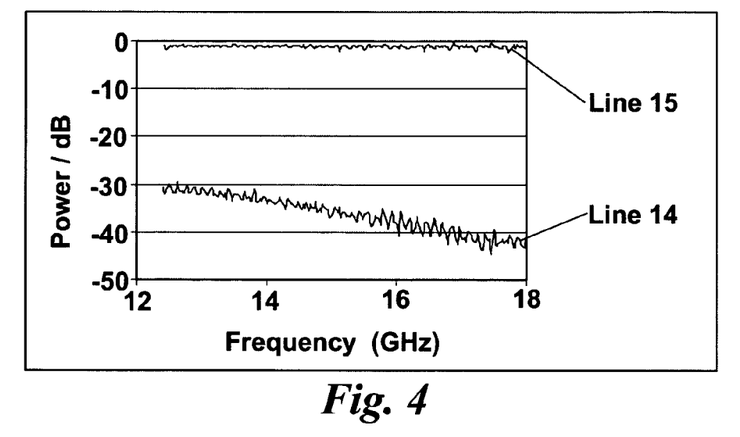
FIG. 4 shows a graph of reflection and transmission through a sample composed of milled carbon fibres dispersed in PU at 20% by volume.

FIG. 4 shows a graph of reflection line 15, and transmission, line 14, through a sample composed of milled carbon fibres dispersed in PU at 20% volume (sample XC4344). As can be seen a 20 volume % loading produces a near metal-like performance, leading to a reflective material (high reflectance value, as indicated by line 15), with only a low level of absorption. As the percentage volume increases beyond 20 vol %, the composition will move towards a perfect reflector, and so will provide little or no absorbance.

Figure 5:
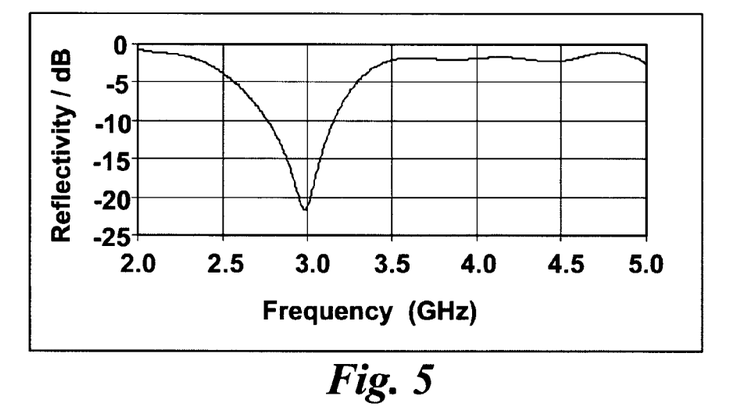
FIG. 5 shows a graph of reflectivity of a 3 GHz absorber.

FIG. 5 shows a graph of reflectivity of a composition which has been formulated and deposited at a selected thickness to specifically absorb at 3 GHz. The composition (sample XC4332) comprises milled carbon fibres dispersed in PU at 5.5 volume %. The composition was deposited onto the test surface at a thickness of 4 mm (λ/4). The graph shows good absorption at greater than 99% (see Table 5), with the maximum absorption occurring in the 3 GHz region.

Figure 6:
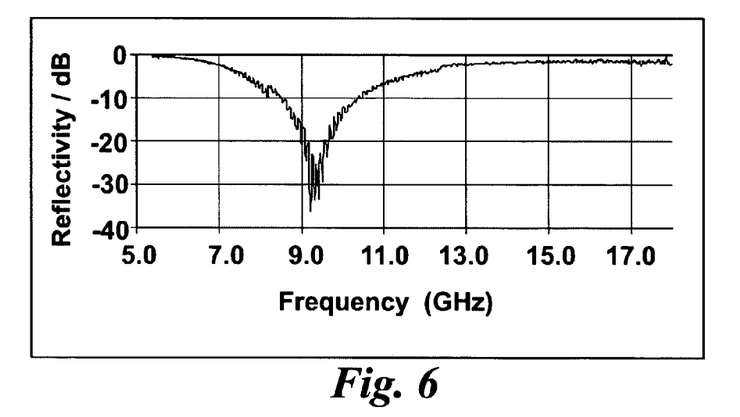
FIG. 6 shows a graph of reflectivity of a 9.4 GHz absorber.

FIG. 6 shows a graph of reflectivity of a composition which has been formulated to specifically absorb at 9.4 GHz. The composition (sample XC4288) comprises milled carbon fibres dispersed in PU at 5.0 volume %. The composition was deposited onto the test surface at a thickness of 1.5 mm (λ/4). The graph shows good absorption at greater than 99.9% (see Table 5), with the maximum absorption occurring in the 9.4 GHz region.

Figure 7:
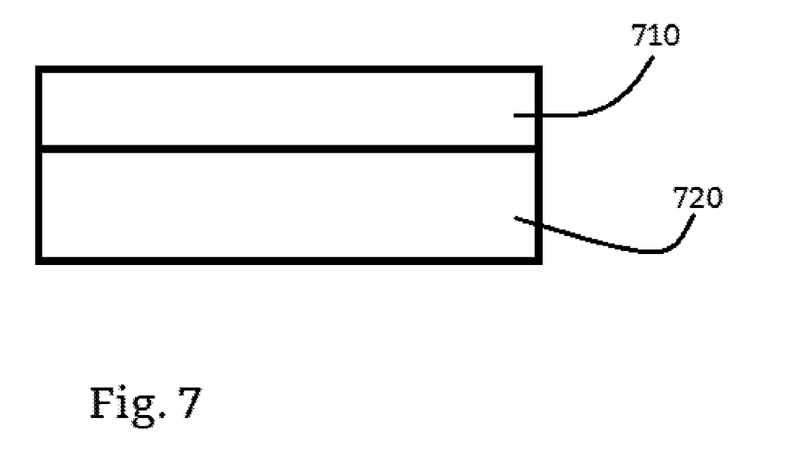
FIG. 7 shows a structure and a film coating the structure.

FIG. 7 shows a structure 720 and a film 710 coating the structure 720. Structure 720 may be a wind turbine, e.g., a wind turbine located in a marine environment. The film may reduce radar reflections. The reduction of these reflections may reduce the structure's impact on the operation of nearby air traffic control (ATC), air defense (ADR), meteorological (MR) and Marine navigational radars (MNR).

Experiment 1

Three compositions each containing a different shaped carbon particles were prepared, according to Table 1, below.

TABLE 1

Different shaped carbon elements in a non conductive binder

| FIG. 1a and 1b | Element type | Average dimension | vol % element dried | binder |
|---|---|---|---|---|
| Line 1 | Spherical particles | 2-12 micron(diameter) | 20 vol % | wax |
| Line 2 | Milled carbon | 7 micron (diameter) 100-150 micron(length) | 6 vol % | Polyurethane |
| Line 3 | Chopped carbon | 7 micron (diameter) 6000 micron (length) | 1 vol % | Polyurethane |

The results of the above formulations are shown in the graphs in FIGS. 1a and b. The graphs show that as the aspect ratio increases, i.e. from spherical to milled to chopped fibre lengths, the dielectric loss tangent (ratio of imaginary to real component, $\in''/\in'$) increases and the loading required to achieve absorbance decreases due to improved connectivity.

To produce an effective absorber requires the correct values of real and imaginary components of permittivity, for example, materials with low values imaginary permittivity produce low conduction loss and therefore do not possess a mechanism for absorbing effectively. This is shown by the results for spherical carbon particles, lines 1a and 1b, in FIGS. 1a and 1b, respectively.

Conversely, materials with high values of the real component of permittivity produce high impedance relative to air. The impedance mismatch at the material surface causes the electromagnetic radiation to be reflected. Likewise, materials possessing high loss tangents ($\in''/\in'>1$), similar to the results for chopped carbon fibres, lines 3a and 3b in FIGS. 1a and 1b, respectively, are not ideally suited to microwave absorption.

Whereas elongate carbon elements that are provided in the dimensions (length) and inclusion ranges according to the invention, provide the optimum trade-off between real and imaginary components of permittivity, as shown in, lines 2a and 2b, in FIGS. 1a and 1b respectively.

The absorption of a composition according to the invention comprising elongate elements when provided in the preferred range is demonstrated by the microwave absorption results given in FIGS. 5 and 6. The properties of said elongate elements in the composition according to the invention can be attributed to the selection of the narrow range of the length of the fibres in combination with their vol % inclusion to optimise their resulting coupling to the applied electromagnetic field. The coupling increases as fibre size increases with a resulting change in the permittivity. However, at lengths approaching 4 mm to 6 mm the primary mode of interaction will be one of reflection, as shown in the chopped fibres line 3a and 3b, in FIGS. 1a and 1b, respectively.

Experiment 2

Preparation of Sample XC4332

The composition was prepared with milled carbon fibres, whose average length was 100-150 microns, diameter 7 microns. The fibres were incorporated 5.5% by volume within a base polyurethane binder material.

| Component | Equivalent Ratio | Equivalent Weight |
|---|---|---|
| PTMEG 1000 | 1.0 | 501.79* |
| Trimethylol propane | 0.2 | 44.7 |
| Isonate M143 | 1.26 | 144.83* |

Table 2 showing formulation of the base polymer

| Additive | As a % by weight of PTMEG and TMP in Part B | As a % by volume of Polymer |
|---|---|---|
| Silcolapse | 0.12 | — |
| Milled Carbon Fibres | 15.95 | 5.5 |

Table 3 showing additional components of the material system

*typical values

The material is manufactured using a "quasi-prepolymer" route. The Part B consists of two parts Isonate M143 to one part PTMEG by mass. The remaining (Polytetramethylene Glycol 1000) PTMEG is added to the Part A to aid with mixing.

| Formulation XC4332 | |
|---|---|
| | Weight in grams |
| PART A | |
| PTMEG 1000 | 192.53 |
| Trimethylol propane | 5.34 |
| Silcolapse 430/BYK 085 | 0.30 |
| Milled Carbon Fibres | 40.10 |
| PART B | |
| PTMEG 1000 | 54.55 |
| Diphenylmethane diisocyanate (Isonate M143) ® | 109.09 |

Part A is mixed with the Part B in the ratio 100:56 by weight.

Blending Part A

The blending is performed using a low shear blender (e.g. Molteni planetary mixer). The TMP may be pre-dissolved in a small amount of the PTMEG to assist with the blending of Part A.

The mixture is placed under a vacuum of at least 5 mbar until fully degassed. The mixing time depends on the type of equipment and the amount of material, but should be sufficient to achieve an evenly dispersed product, free from solid agglomerates. Care must be taken to ensure that the mixing process does not significantly affect the final density of the material.

Blending Part B

The dry PTMEG is heated to 60° C. and degassed for 2 hours at a reduced pressure of 5 mbar immediately before use. The PTMEG is then added to the Isonate®, with stirring, and the mixture is heated at 60° C. for 4 hours at a reduced pressure of 5 mbar.

The composition was deposited as an appliqué film with a thickness of 4 mm (300×300 mm panel).

Experiment 3

The measurements, as shown in Table 4 and 5 below, were undertaken using a focussed horn system arrangement. The compositions were manufactured by casting, i.e. forming an appliqué film at the desired thickness, but may alternatively be applied using spray painting technology or trawling, as hereinbefore defined. The appliqué test sample materials were made to dimensions of 300 mm×300 mm, with different thicknesses.

The equipment comprised of an Anritsu 37397C vector network analyser connected to corrugated microwave horns. The horns were focused by mirrors to the mid-plane, where the test samples were positioned. The focussed horn set up was used to measure the complex scattering, S, parameters associated with transmission and reflection from the test samples, from which the permittivity, $\in$, was obtained using the Nicholson and Ross method [Pitman K C, Lindley M W, Simkin D and Cooper J F 1991 Radar absorbers: better by design *IEE Proc.—F* 138 223].

For reflectivity measurements, such as those in FIGS. 5 and 6 respectively, a metal backing plane was applied to the test samples and a similar set of measurements carried out, to determine the degree of absorption (i.e. reduced reflectivity) from the test samples.

The elongate carbon elements were the same milled carbon fibres as defined in experiment 2 above. The following compositions were prepared in an analogous manner to those in experiment 2, with different vol % inclusion of milled fibres.

| Sample number | Carbon fibre (vol %) in PU | Coating thickness/ mm | $\epsilon'$ | $\epsilon''$ |
|---|---|---|---|---|
| XC4343 (FIG. 2a) FIG. 3 | 0.5 | 1(±0.2) | 4 at 15 GHz | 0.5 at 15 GHz |
| XC4285 (FIG. 2b) | 2 | 1.2(±0.2) | 14 at 10 GHz | 1.7 at 10 GHz |
| XC4286 (FIG. 2c) | 3 | 1.2(±0.2) | 26 at 10 GHz | 3.8 at 10 GHz |
| XC4288 (FIG. 2d) | 5 | 1.4(±0.3) | 33 at 10 GHz | 6.1 at 10 GHz |
| XC4332 (FIG. 5) | 5.5 | 4(±0.3) | | |
| XC4297 (FIG. 2e) | 6 | 4(±1) | 38 at 10 GHz | 13.3 at 10 GHz |
| XC4344 (FIG. 4) | 20 | 1.7(±0.5) | | |

Table 4 showing different vol % (dry) inclusions of milled carbon fibres in a PU mix.

| Sample number (carbon fibre vol % in PU) | Coating thickness/ mm | Sample measured without metal backing (Results at 15 GHz) | | | Sample measured with metal backing | | |
|---|---|---|---|---|---|---|---|
| | | Reflection dB / % | Transmission dB / % | Absorption % | Peak loss position GHz | Peak Reflectivity dB / % | Absorption % |
| XC4343 (0.5 vol %) | 1(±0.2) | 7.6 / 17 | 1.4 / 72 | 11 | | | |
| XC4285 (2 vol %) | 1.2(±0.2) | 2.0 / 63 | 5.8 / 27 | 10 | 16 | 9.2 / 12 | 88 |
| XC4286 (3 vol %) | 1.2(±0.2) | 1.8 / 66 | 7.3 / 18 | 16 | 12 | 15 / 3 | 97 |
| XC4288 (5 vol %) | 1.4(±0.3) | 4.7 / 34 | 7.0 / 20 | 46 | 9.4 | 33 / 0.05 | 99.95 |
| XC4332 (5.5 vol %) | 4(±0.3) | | | | 3 | 21 / 0.8 | 99.2 |
| XC4297 (6 vol %) | 4(±1) | 3.4 / 46 | 19.4 / 1 | 53 | | | |
| XC4344 (20 vol %) | 1.7(±0.5) | 1 / 80 | 36 / 0.03 | 20 | | | |

Table 5 showing reflection and transmission for different sample types.

The results in Table 4 and Table 5 above, show that the optimal results for an absorber are achieved by selecting a narrow range of inclusion of said elongate carbon elements, namely greater than 0.5 vol % inclusion and 20 vol % or less. A reflectivity of 20 dB corresponds to 99% of the incident signal being absorbed.

FIGS. 5 and 6 and the % absorbance values in Table 5 show that the milled carbon fibres, which have an average length and volume % inclusion, provided in the ranges according to the invention, give rise to effective absorbers.

The compositions when provided at the prerequisite thickness to provide 3 GHz and 9.4 GHz absorbers, are mere examples of selected narrow frequency absorbers, and therefore the composition according to the invention is not limited to these frequencies. The composition may be deposited at other thicknesses in order to produce optimum performance at alternative frequencies.

The invention claimed is:

1. A method of providing absorption of electromagnetic radiation at a selected frequency on a surface structure or body or portions thereof, comprising the steps of
determining the selected frequency,
applying at least one coat of electromagnetic radiation absorbing composition at a thickness which selectively absorbs at said frequency or an appliqué film comprising the electromagnetic radiation absorbing composition, to a first side of said surface structure or body or portions thereof,
and drying the electromagnetic radiation absorbing composition,
wherein the electromagnetic radiation absorbing composition comprises a carbon filler substantially consisting of machined elongate carbon elements with an average longest dimension in the range of 100 to 150 microns, with a thickness in the range of 1 to 15 microns, wherein the total carbon filler content is present in the range of from 2 to 10 volume % dried, in a non conductive binder, and wherein the binder is selected from an acrylate, an epoxy binder, an acrylic, a urethane and epoxy-modified acrylic, a polyurethane, an alkyd, a modified alkyd, a fluoropolymer, and mixtures thereof,
wherein the electromagnetic radiation absorbing composition after the drying step has a dielectric loss tangent that is configured to absorb microwave radiation, the dielectric loss tangent being a ratio of an imaginary component of complex permittivity to a real component of complex permittivity,
wherein the method further comprises applying at least one or more sub-layers, each of which have been separately applied in an orthogonal direction to the preceding layer.

2. The method according to claim 1, wherein the elongate carbon elements are cylindrical and have a diameter in the range of from 5 to 10 microns.

3. The method according to claim 1, wherein the elongate carbon elements have an average thickness to average longest dimension ratio of from 1:10 to 1:25.

4. The method according to claim 1, wherein the binder is selected from a water based dispersion comprising a binder selected from an acrylic, or polyurethane based latex.

5. The method according to claim 1, wherein the composition is a liquid formulation.

6. The method according to claim 1, wherein the thickness of said coating is one quarter of the wavelength ($\lambda/4$) of the resonant frequency of the incident radiation to be absorbed.

7. The method according to claim 1 further comprising providing an electromagnetic reflective backplane between the surface, structure or body and the at least one dried coating.

8. The method according to claim 1, wherein the machined elongate carbon elements are milled carbon fibers.

9. The method according to claim 5, wherein the composition comprises a solvent.

10. The method according to claim 1, further comprising applying at least one coat of electromagnetic radiation absorbing composition at a thickness which selectively absorbs at said frequency or an appliqué film comprising the electromagnetic radiation absorbing composition, to a second side of said surface structure or body or portions thereof.

* * * * *